United States Patent Office 3,726,862
Patented Apr. 10, 1973

3,726,862
AZIRIDINYL COMPOUNDS
William P. Coker, Lake Jackson, Prella M. Phillips, Angleton, and Gordon R. Miller, Lake Jackson, Tex., assignors to The Dow Chemical Company, Midland, Mich.
No Drawing. Continuation-in-part of application Ser. No. 309,865, Sept. 18, 1963, now Patent No. 3,338,885. This application Oct. 3, 1966, Ser. No. 583,979
Int. Cl. C07d 23/06
U.S. Cl. 260—239 E
7 Claims

ABSTRACT OF THE DISCLOSURE

Di-, tri-, and tetra-(1-aziridinyl)alkyl esters of carboxylic acids (e.g., adipic acid, terephthalic acid, trimellitic acid, trimesic acid, pyromellitic acid, citric acid, etc.), useful as inhibitors for haloalkanes and as curing agents for acid terminated polymers are prepared by reacting an aziridinylalkyl alcohol (e.g., 2-(1-aziridinyl)ethanol) and an ester of a di-, tri-, or tetracarboxylic acid in the presence of an alkali metal alcoholate.

---

This application is a continuation-in-part of application Ser. No. 309,865, filed Sept. 18, 1963, now U.S. Pat. 3,338,885.

This invention relates to new compositions of matter containing an N-heterocyclic group and to the preparation of such compositions. More particularly, the present invention relates to (1-aziridinyl) alkyl esters of carboxylic acids containing from 2 to 4 (1-aziridinyl) alkyl groups and to the preparation of these compounds.

Esters of aziridinyl-carboxylic acids are known. Such compounds are disclosed in U.S. Pats. 2,596,200 (Bestian), 2,824,857 (Drechsel) and 2,901,443 (Stark et al.). In these compounds, however, the aziridinyl radical forms part of the acyl group. Other esters which contain an aziridinyl group in the molecule are disclosed in British Pat. 783,728, by Staab et al. in Angewandte Chemie, 73, 143 (1961) ($\alpha$-vinyl-1-aziridineethanol acetate) and by Yoshida et al. in J. Chem. Soc. Japan, Ind. Chem. Sect., 55, 455–7 (1952) ($\alpha$-methyl-1-aziridinemethanol acetate). Both of the two named esters contain a reactive group (a vinyl or aziridinyl group, respectively) on the carbon atom which is alpha to the non-oxo oxygen atom. In addition, the compound gamma-ethyleneimino-propyl methacrylate is disclosed by Hendry et al. in the British Journal of Pharmacology and Chemotherapy, vol. 6, pp. 357–410 (1951). Such compounds, however, either do not rearrange to form hydroxy compounds with a nitrogen atom directly attached to a carbonyl group (as do the 2-(1-aziridinyl) alkyl esters) or else rearrange very slowly.

Such mono-esters as $\beta$-(1-aziridinyl) ethyl acetate are disclosed by Tsou et al. in J. Med. Chem., 6, 435–439 (1963). The attempted preparation of difunctional (1-aziridinyl) alkyl esters was reported there as unsuccessful.

It has now been discovered that polyfunctional (1-aziridinyl) alkyl esters can be conveniently prepared by an ester interchange reaction between a polyfunctional ester of a carboxylic acid and a (1-aziridinyl) alkanol compound, or a (1-aziridinyl) alkanol in which at least one carbon atom of the aziridinyl group is substituted.

The preparation of the compounds of the invention is based upon the following reaction:

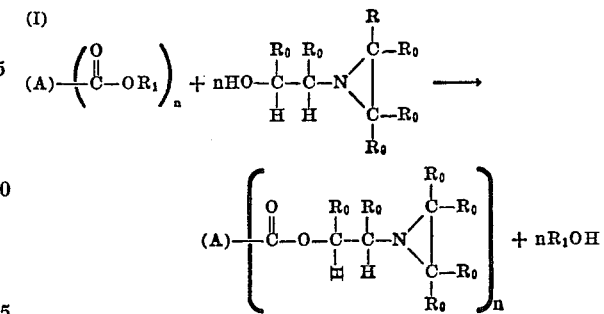

wherein A may be a hydrocarbyl group or substituted hydrocarbyl group of valence $n$ with from 2 to 17 carbon atoms, $n$ is 2, 3, or 4, each $R_0$ (which may be the same or different) is hydrogen or a lower alkyl group of from 1 to 4 carbon atoms (methyl, ethyl, n-propyl, i-propyl, n-butyl, i-butyl, sec.-butyl and t-butyl), and $R_1$ is a lower alkyl group. Typical hydrocarbyl A groups include alkylene groups of from 2 to 10 carbon atoms, such as ethylene, propylene and butylene groups as well as higher groups such as $(CH_2)_{10}$, arylene groups having from 6 to 10 carbon atoms, such as

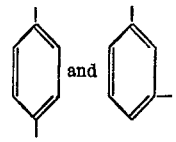

trivalent aliphatic and aromatic groups, both substituted and unsubstituted, such as

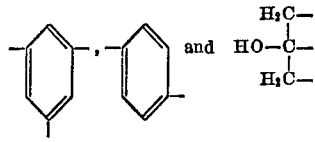

tetravalent aliphatic and aromatic groups, both substituted and unsubstituted, such as

and the like. A may contain substituents inert to the ester interchange reaction, such as hydroxyl, and the like. A may contain acetylenic linkages but is preferably free of such bonds. $R_1$ is preferably an alkyl group of from 1 to 4 carbon atoms, e.g., methyl, ethyl, n-propyl, i-propyl, n-butyl, i-butyl, sec-butyl, or t-butyl. It is preferable to carry out the reaction with an excess of aziridinyl alcohol reactant, to assure complete interchange of the polyfunctional carboxylic acid ester.

Typical examples of starting aziridinyl alcohols (named according to the Geneva system with the hydroxyl position given the lowest number) include 2-(1-aziridinyl)-ethanol,
2-(1-aziridinyl)-1-propanol,
2-(2,3-dimethyl-1-aziridinyl)-1-butanol,
2-(2,2-diethyl-1-aziridinyl)-ethanol,
2-(2-n-butyl-1-aziridinyl)-ethanol,
1-(2-methyl-3-ethyl-1-aziridinyl)-2-butanol and
1-(1-aziridinyl)-2-hexanol These and other (1-aziridinyl)-alkanols may be prepared by reacting aziridine or an alkyl-substituted aziridine compound with an epoxyalkane. A suitable method of preparation is disclosed in U.S. Patt. 2,475,068 to Wilson, the teachings of which are incorporated herein by reference.

The ester which is reacted with the aziridinyl alcohol may be any polyfunctional ester of a carboxylic acid which will exchange with the aziridinyl alcohol. Ordinarily, esters of carboxylic acids and alkanols are employed. Examples of suitable polycarboxylic acid esters include dimethyl adipate, diethyl adipate, dimethyl succinate, methylethyl succinate, dimethyl maleate, diethyl azelate, dimethyl pimelate, dimethyl suberate, dimethyl glutarate, dimethyl glutaconate, dimethyl and diethyl terephthalate and isophthalate, trimethyl and triethyl trimellitate, trimesate, citrate, isocitrate, oxalosuccinate, cis aconitate, tetramethyl and tetraethy pyromellitate, and the like.

Preferred esters of dicarboxylic acids may be represented by the formula

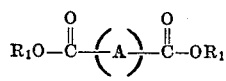

wherein each $R_1$ (which may be the same or different) is as previously defined and is preferably an alkyl group of from 1 to 4 carbon atoms, A is an alkylene group of from 2 to 10 carbon atoms or an arylene group of from 6 to 10 carbon atoms, as previously exemplified.

A second preferred group of ester reactants are the $C_1$-$C_4$ alkyl esters of trimellitic, trimesic, citric, and pyromellitic acids.

The ester exchange reaction is generally carried out in the presence of an alkali metal alkoxide catalyst (such as sodium methoxide, potassium methoxide, sodium ethoxide or sodium tertiary-butoxide, for example) or an alkali metal aziridinyl alkoxide (such as sodium-2-(1-aziridinyl)ethoxide, potassium-2-(1-aziridinyl)ethoxide, sodium-2-(1-aziridinyl)-n-propoxide, etc.) corresponding to the formula

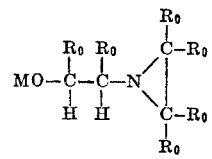

wherein M represents an alkali metal atom (Na, K, Li, for example) and $R_0$ is as previously defined in reaction I. Preferred metal aziridinyl alkoxides which are used in the reaction are those wherein the aziridinyl alkoxide portion of the molecule corresponds to the aziridinyl alcohol to be exchanged. These compounds may be added individually or may be formed in situ by merely adding an alkali metal (preferably in finely divided form) to the aziridinyl alcohol in the reaction mixture. Catalytic amounts (usually from .001 to .25 mole of alkali metal per mole of aziridinyl alcohol, either free or combined to form organic oxides) promote the reaction.

The process is generally carried out under reflux conditions (from about 50 mm. of Hg to atmospheric pressure) using temperatures of from about 25° to 110° C. (preferably from about 50° to 110° C. at atmospheric pressure). The aziridinyl alcohol reactant is preferably used in excess of its equivalent amount to assure completion of the ester interchange. Equivalent ratios of aziridinyl alcohol to polycarboxylic acid ester in the range from about 1:1 to about 5:1 are desirably employed.

When the byproduct $R_1OH$ is the most volatile component of the reaction mixture, it is convenient to distill it out as fast as it is formed, thus helping to drive the reaction to completion.

The compounds of the invention are useful as inhibitors to retard or prevent the reaction of aluminum with various degreasing solvents such as 1,1,1-trichloroethane and other halogenated solvents. Only an inhibiting amount of the compound is necessary. Amounts of up to 10 to 15 percent by weight of aziridinyl ester compound are sufficient to inhibit the decomposition of 1,1,1-trichloroethane by aluminum. Preferably, amounts of from about 0.01 percent to about 3.0 percent are used for the most economical inhibitor systems.

The compounds of the invention may be rearranged under suitable reaction conditions according to the equation:

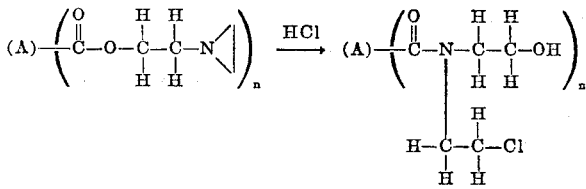

wherein A and $n$ are as defined in Equation I. Furthermore, the compounds of the invention inhibit or prevent the growth of E. Coli and may be used for this purpose in either concentrated or dilute solutions in any suitable solvent.

Additionally, the compounds of this invention exhibit unexpectedly advantageous properties as curing agents for acid terminated polymers. This use is the subject of a commonly owned copending application entitled "(1-aziridinyl)alkyl Curing Agents for Acid Terminated Polymers," filed by Edwin J. Wilson and Harold E. Filter on the same day as the present application.

The following examples are illustrative only and are not to be construed as limiting the scope of the invention in any way.

Example I.—Preparation of di[2-(1-aziridinyl)-ethyl] adipate

Into a one-liter distillation flask fitted with a nitrogen sparger was placed 345.7 grams (about 3.99 moles) of N-(2-hydroxyethyl) aziridine containing 4.7 grams of sodium 2-(1-aziridinyl) ethoxide. To this mixture 174.0 grams (1 mole) of dimethyl adipate was added and the flask was connected to a distillation column. The reaction mixture was heated to 60° C. and methanol was removed at reduced pressure throughout the reaction period of one hour. The excess N-(2-hydroxyethyl) aziridine was removed at up to 72° C. at 0.24 mm. of Hg. The di[2-(1-aziridinyl)ethyl] adipate was collected at 135° C. and 0.2 mm. of Hg and yielded 166.8 grams (about .58 mole). This represents a recovered yield of 58.0 percent di[2-(1-aziridinyl)ethyl] adipate based on 100 percent conversion of dimethyl adipate. The following physical properties of di[2-(1-aziridinyl)ethyl] adipate were obtained: $n_D^{23}$ of 1.4674; specific gravity at 20° C. of 1.079.

Analysis (percent by weight).—Calculated: C, 59.2; H, 8.46; N, 9.86; $C_2H_4N$, 29.6. Found: C, 59.09; H, 8.35; N, 10.02; $C_2H_4N$, 29.5.

Similar products may be obtained from other dicarboxylic acids such as dimethyl terephthalate or isophthalate and aziridinyl alkanols as described previously.

Example II.—Preparation of tris[2-(1-aziridinyl)ethyl] trimesate

Into a two-liter distillation flask equipped with stirring means, temperature controlling means, and a twelve inch distillation column were placed 110 g. (1.12 equiv.) of triethyl trimesate and 700 ml. of benzene. This mixture was boiled to remove any water present by azeotropic distillation. When cool, 106 g. (1.22 equiv.) of N-(2-hydroxyethyl) aziridine and 1.0 g. (0.0435 mole) of sodium were added. The flask was heated to between 80° and 85° C., and ethyl alcohol was removed by azeotropic distillation as fast as the overhead temperature would allow. After eight hours a quantity of 160 ml. of azeotrope had been removed. The product was filtered, and volatiles were stripped, leaving a residue of 151.6 g. of product. A second run according to the same procedure gave 167.1 g. of product. The products were diluted in anhydrous ethyl ether, filtered, and the ether stripped away, leaving a total of 284 g. of purified product. The purified product was a red-amber viscous liquid of $n_D^{20}$ 1.5245. Infrared spectroscopy gave a spectrum consistent with the structure of tris-[2-(1-aziridinyl)ethyl] trimesate. A yield of 88 percent of tris[2-(1-aziridinyl)ethyl] trimesate was obtained, based on the combined runs.

Example III.—Preparation of tris[2-(1-aziridinyl)ethyl] trimellitate

Into a two-liter flask equipped as in Example II was placed 480 g. (4.92 equiv.) of triethyl trimellitate. The reaction product of 0.7 g. (0.03 moles) of sodium and 550 g. (6.3 equiv.) of N-(2-hydroxyethyl) aziridine was poured into the flask with stirring. The resulting mixture was heated to 85° C. at 35–40 mm. Hg pressure for four hours. A quantity of 170.2 g. of ethyl alcohol and 173.5 g. of N-(2-hydroxyethyl) aziridine was removed by distillation at reduced pressure. A crude product of 683.8 g. was obtained, which was purified as in Example VIII to give 558.5 g. of a red-amber viscous liquid, which had $n_D^{25}$ 1.5189, $$d\frac{25}{4}\ 1.1682$$

a viscosity at 25° C. of 521 cs., $\overline{M}_n$ 440, and a flash point of 382° F.

Tetra[2-(1-aziridinyl)ethyl] pyromellitate may be prepared by substituting tetraethyl pyromellitate in equivalent amount for the triethyl trimellitate in the above procedure.

Example IV.—Preparation of tris[2-(1-aziridinyl)ethyl] citrate

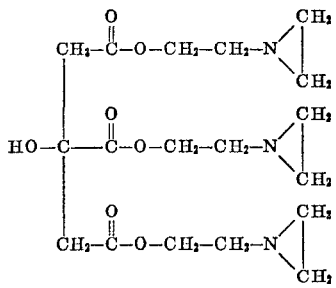

Into a two liter flask equipped as in Example II was placed 276.3 g. (1.0 mole) of triethyl citrate. The reaction product of 0.5 g. (0.032 mole) of sodium and 270 g. (3.1 moles) of n-(2-hydroxyethyl) aziridine was poured into the flask with stirring. The mixture was heated at a temperature between 70° and 80° C. at between 50 and 60 mm. Hg pressure for four hours. The pressure was reduced to 0.2 mm. Hg, and the flask was heated at 80° C. for an additional one-half hour. A quantity of 59 g. of ethyl alcohol and 104 g. of N-(2-hydroxyethyl)aziridine distillate was recovered. The residue was 367.9 g. of crude product. The crude product was taken up in 1.5 liters of ethyl ether, filtered, and the ether evaporated, to give 235.7 g. of a red-amber viscous liquid product having an aziridine content of 20.5 weight percent by hydrogen iodide analysis. Infrared spectroscopy of the product showed it to be a mixture of tris[2-(1-aziridinyl)ethyl] citrate and bis[2-(1-aziridinyl)ethyl]ethyl citrate.

We claim as our invention:

1. A compound of the formula

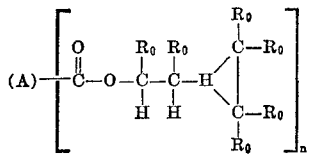

wherein:
(a) n is an integer from 2 to 4,
(b) A is a hydrocarbyl group of from 2 to 10 carbon atoms of valence n, and
(c) each $R_0$ is, independently, hydrogen or a lower alkyl group.

2. The compound of claim 1 wherein n is two.
3. The compound of claim 2 wherein A is an alkylene or arylene group.
4. The compound of claim 3 wherein A is $-(CH_2)_4-$ and each $R_0$ is hydrogen.
5. The compound of claim 1 wherein n is three.
6. The compound of claim 5 wherein A is

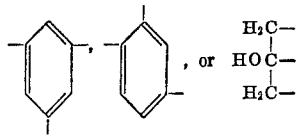

and wherein each $R_0$ is hydrogen.

7. The compound of claim 5 wherein A is the hydrocarbyl radical formed by removal of the carboxyl groups from pyromellitic acid.

References Cited

Tsou et al., J. Med. Chem., vol. 6, pp. 435–9 (1963).

ALTON D. ROLLINS, Primary Examiner

UNITED STATES PATENT OFFICE
CERTIFICATE OF CORRECTION

Patent No. 3,726,862                Dated  April 10, 1973

Inventor(s) William P. Coker, Prella M. Phillips, Gordon R. Miller

It is certified that error appears in the above-identified patent and that said Letters Patent are hereby corrected as shown below:

Col. 2, line 5, the left hand portion of the formula should read:

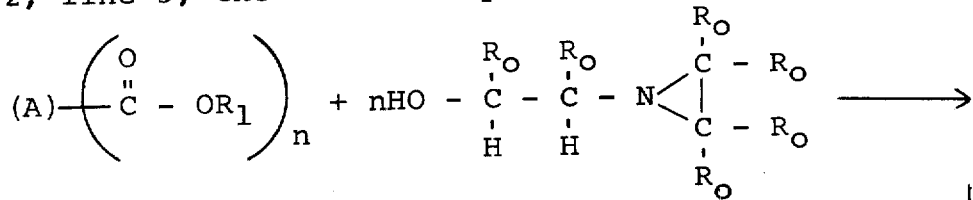

Col. 2, line 38, the second benzene ring should be: 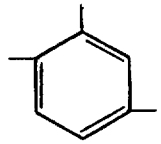

Col. 3, line 4, "Patt." should read --Pat.--;

line 17, "tetraethy" should read --tetraethyl--.

Col. 5, line 36, the upper portion of the formula should read:

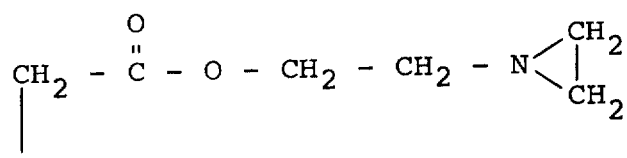

Col. 6, line 18, change the formula to read:

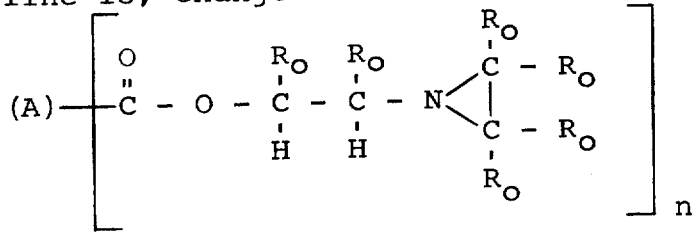

Signed and sealed this 20th day of November 1973.

(SEAL)
Attest:

EDWARD M. FLETCHER, JR.                RENE D. TEGTMEYER
Attesting Officer                       Acting Commissioner of Patents